United States Patent [19]
Gough et al.

[11] Patent Number: 5,603,053
[45] Date of Patent: Feb. 11, 1997

[54] SYSTEM FOR ENTERING DATA INTO AN ACTIVE APPLICATION CURRENTLY RUNNING IN THE FOREGROUND BY SELECTING AN INPUT ICON IN A PALETTE REPRESENTING INPUT UTILITY

[75] Inventors: Michael L. Gough, Ben Lomond; Bruce V. Holloway, Marina, both of Calif.

[73] Assignee: Apple Computer, Inc., Cupertino, Calif.

[21] Appl. No.: 610,852

[22] Filed: Mar. 5, 1996

Related U.S. Application Data

[63] Continuation of Ser. No. 60,438, May 10, 1993, abandoned.

[51] Int. Cl.$^6$ .................................................. G06F 13/00
[52] U.S. Cl. .................... 395/825; 395/155; 395/159; 345/156; 345/179
[58] Field of Search .................................. 395/159, 825, 395/155; 345/156, 179

[56] References Cited

U.S. PATENT DOCUMENTS

| | | | |
|---|---|---|---|
| 5,345,543 | 9/1994 | Capps et al. | 395/137 |
| 5,347,295 | 9/1994 | Agulnick et al. | 345/156 |
| 5,386,219 | 1/1995 | Greanias et al. | 345/174 |
| 5,398,310 | 3/1995 | Tchao et al. | 395/144 |
| 5,404,442 | 4/1995 | Foster et al. | 395/159 |

OTHER PUBLICATIONS

Cowart, Robert, "Mastering Windows 3.1", First edition 1992, 1993, p. 67.

Sherer, Paul M., "Windows plan include multimedia, pen DLLs", Nov. 19, 1990, pp. 1–2.

PenPoint (GO Corporation manual).

Macintosh User's Guide for Desktop Macintosh Computers (pp. 254–255).

Pen Windows (Microsoft Corp.).

GO Corporation, 'Using Penpoint', (Date Unknown), GO Corporation Developer Release –Beta Edition.

Microsoft Corporation, Pen for Windows, (See software users manual –Applicant not in possession of one).

*Primary Examiner*—Thomas C. Lee
*Assistant Examiner*—Le Hien Luu
*Attorney, Agent, or Firm*—Hickman Beyer & Weaver

[57] ABSTRACT

The present invention provides method and apparatus for inputting data to an active application of a computer system. A method of the present invention comprises the steps of creating an input image on a screen of a computer system, detecting the engagement of the input image by a pointer, analyzing the engagement to determine input data, and sending the input data to the active application program. Another method of the present invention comprises the steps of initializing a computer implemented process for intercepting input request calls made by the active application program, creating an input image on the computer system's screen, detecting an engagement of a pointer with the input image, analyzing the engagement to determine potential input data, and sending the input data to the application program. The present invention preferably includes an organizational image including a palette and a number of icons representing input utilities. The icons can be dragged off of the palette to activate a selected utility.

26 Claims, 11 Drawing Sheets

SYSTEM FOR ENTERING DATA INTO AN ACTIVE APPLICATION CURRENTLY RUNNING IN THE FOREGROUND BY SELECTING AN INPUT ICON IN A PALETTE REPRESENTING INPUT UTILITY

This is a continuation of application Ser. No. 08/060,438 filed May 10, 1993, now abandoned.

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based or pen-aware computer system. A pen-based computer system is typically a small, hand-held computer where the primary method for inputting data includes a "pen" or stylus. A pen-aware computer system is one which has been modified to accept pen inputs in addition to traditional inputs, such as keyboard inputs. Both pen-based and pen-aware computer systems can be generically referred to as "pen computer systems" or "pen systems."

A pen computer system is often housed in a relatively flat enclosure, and typically has a dual-function display assembly which serves as both an input device and an output device. When operating as an input device, the display assembly senses the position of the tip of a stylus on the viewing screen and provides this positional information to the computer's central processing unit (CPU), i.e. the display assembly can serve as an input "tablet." Some display assemblies can also sense the pressure of the stylus on the screen to provide further information to the CPU. When operating as an output device, the display assembly presents computer-generated images on the screen.

The dual-function display assemblies of pen computer systems permit users to operate the computer as a computerized notepad. For example, graphical images can be input into the pen computer by merely making strokes with the stylus on the surface of the screen. A "stroke" is generally defined as the engagement of the screen by a stylus, the movement of the stylus across the screen (if any), and its subsequent disengagement from the screen. As the CPU senses the position and movement of the stylus, it can generate a corresponding image on the screen to create the illusion that the stylus is drawing the image directly upon the screen, i.e. that the stylus is "inking" an image on the screen. With suitable recognition software, text and numeric information can also be entered into the pen computer system in a similar fashion. Besides serving as a notepad, pen computers can provide a number of useful functions, such as serving as an address book, an appointment calendar, a to-do list, etc.

Because pen computer systems are often limited to stylus type inputs, pen system designers often create a number of small utilities to aid in the input process. These utilities can be displayed on the screen of the pen computer as icons and activated by a tap of the stylus or some other stylus gesture. Alternatively, the utilities can be stored off-screen. As the number of utilities increases, it becomes more difficult to organize these utilities and more cumbersome to activate them. Separate icons provided on the pen computer's screen for each of these utilities reduces the actual "desk space" usable for application program windows. Further, activation of the utilities often does not allow for flexibility in placement or size. Input tools created by these utility programs are sometimes placed in specific areas of the screen, which also limits user control of the screen desk space.

When reliable recognition of input text information and characters is desired, the keyboard is one of the most accurate methods of entering data. To maintain the purpose and portability of a pen computer system, addition of an external keyboard is not usually practical, but the benefits of such an addition are definitely desirable. These benefits can be achieved in a pen system by an input utility which provides a keyboard image on the computer's screen. Data can then be input to the system by selecting a "key" on the keyboard image with a stylus.

A prior art form of a keyboard input utility is the Key Caps Desk Accessory available on Macintosh computers available from Apple Computer, Inc. of Cupertino, Calif. Key Caps is a pop-up keyboard that displays a replica of the layout of the last keyboard used with the system to allow "typing" of text by selection of the keys with a mouse or other pointer mechanism. The typed text in Key Caps is displayed in a separate one line display of the keyboard. While Key Caps provides a keyboard for typing input by using a mouse or other pointer mechanism, it does not perform like an external keyboard, because it is incapable of directly inputting data into an active application program.

Another prior art form of a visual keyboard utility is provided in PENPOINT™ Operating System from GO Corporation of Foster City, Calif. However, the PENPOINT keyboard only operates in conjunction with applications specifically designed for the PENPOINT operating system. In consequence, the PENPOINT keyboard cannot emulate a physical keyboard for non-pen-aware application programs which require physical keyboard input.

Pen Windows from Microsoft Corporation of Redmond, Wash. is also an operating system for pen computer systems that provides utilities including a keyboard image for inputting data. It operates similarly to the PENPOINT operating system but differs from PENPOINT by operating with non-pen-aware application programs.

In view of the foregoing, there is a need for the flexible and organized control of input utilities in a pen computer system. The utilities should preferably be easily activated with user control over size and placement of the utilities. The utilities should preferably be grouped together in a logical fashion, and should always be available for activation.

SUMMARY OF THE INVENTION

The present invention satisfies these needs by providing an organized group of icons representing input utilities for a pen computer system. The utilities are easily activated, and the location of the activated utilities is selected by the user of the pen computer system.

A method of the present invention begins with the steps of creating an organizing image on a screen of a computer system. The organizing image preferably includes a palette having at least one icon that represents an input utility. The input utility can be activated by dragging the icon off of the palette to a desired operational position, or by "clicking" on the icon with a stylus.

The method of the present invention can additionally include the step of initializing a computer implemented process for intercepting input request calls made by an active application program to an "event queue" of the pen computer system's operating system. The computer implemented process creates an organizing image on the computer system's screen, detects an engagement of a stylus with the organizing image, analyzes the engagement to determine potential input data, and sends appropriate input data to the application program. The interception of input request calls allows the computer implemented process to control the system event queue, and thereby preempt I/O to the pen computer system, as desired.

The present invention also includes a method for launching an input utility. The method involves displaying a palette having at least one icon representing an input utility, and selecting the icon to create an input image. The selection of the icon preferably involves engaging the icon with a stylus and moving the stylus across the screen. Preferably, an outline of the input image is dragged with the stylus so that the input image can be placed on the screen without interfering with other screen images. Activation of the input utility occurs when the stylus is removed from the screen.

An apparatus of the present invention for implementing these methods comprises a central processing unit (CPU), a screen, a tablet, and a stylus adapted to engage the tablet to input strokes to the CPU. The apparatus also includes organizing image creation means, detection means that detects strokes engaging the organizing image, and data passing means that sends data to the application program in response to the strokes detected on the organizing image.

Through the methods and apparatus of the present invention a palette of icons and control buttons is always available for user selection of input images for data input. The present invention also allows input images to be selectively moved from the palette and placed at a desired location on the screen. The palette also can be selectively moved around on the screen.

By intercepting input request calls made by active application programs, the computer implemented process of the present invention can take control of system I/O. This can provide such functionality as a pseudo "keyboard" displayed upon the computer screen which, for all intents and purposes, behaves like a physical keyboard as far as the active application program is concerned.

Input images of various utilities provided on the organizing image can be hidden from view when not required, thus uncluttering the "desk space" on the computer screen. Also, a control button on the palette allows deactivation and reactivation of the input images with a single tap on the screen, allowing for quick and easy clean-up of the screen.

These and other advantages of the present invention will become apparent upon a reading of the following descriptions and a study of the various figures of the drawing.

BRIEF DESCRIPTION OF THE DRAWINGS

FIG. 2b illustrates an enlarged view of the organizing image of FIG. 2a;

DETAILED DESCRIPTION OF THE PREFERRED EMBODIMENTS

The present invention is well suited for pointer based computer systems such as the pen-based, pen-aware and mouse-based systems that are currently popular. For the purposes of illustration, the invention will be described in connection with a pen-based or pen-aware system, hereinafter referred to generically as a "pen computer system" or a "pen system."

Figure 1:
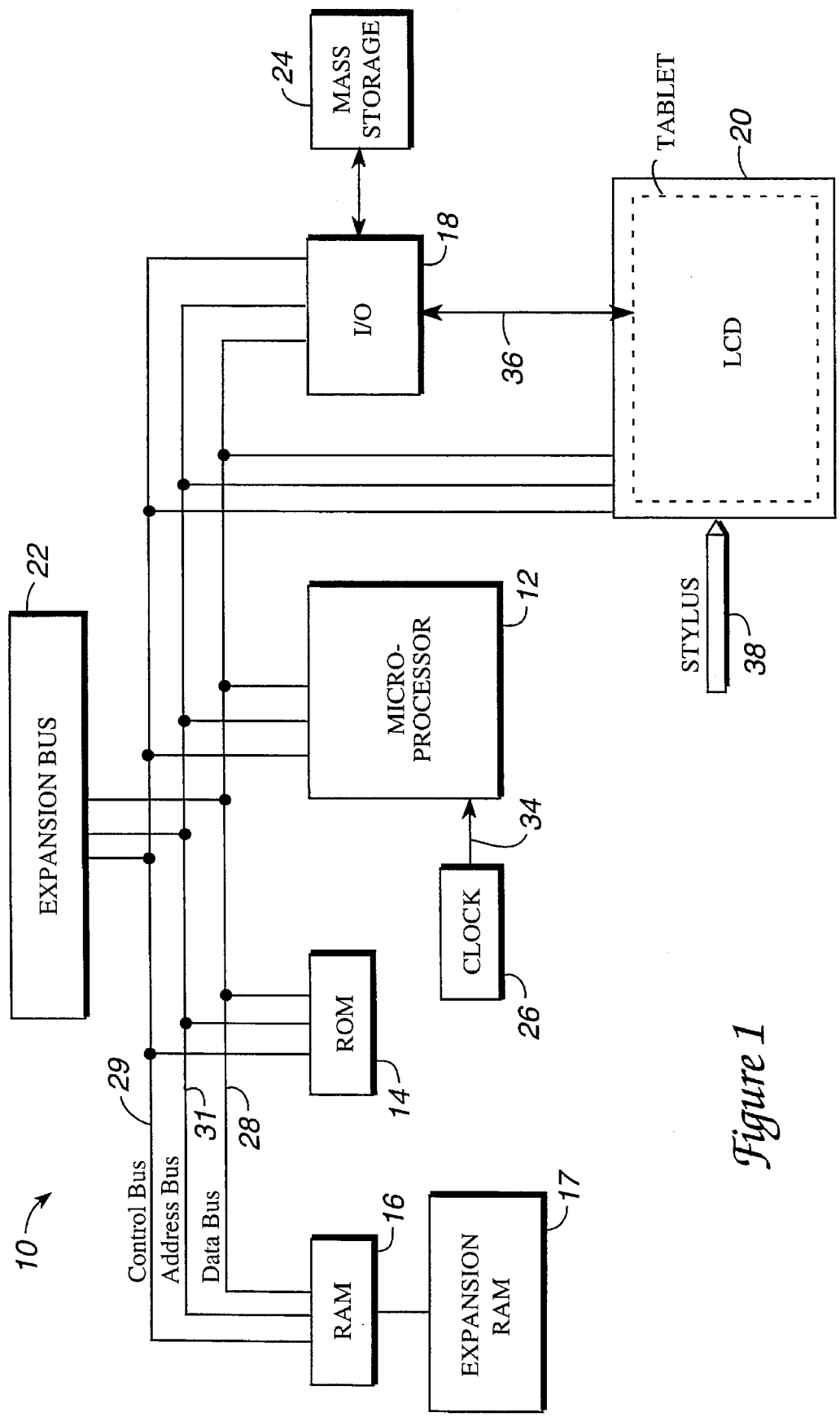
FIG. 1 is a block diagram of a computer system in accordance with the present invention.

As shown in FIG. 1, a pen computer system 10 in accordance with the present invention includes a central processing unit (CPU) 12, read only memory (ROM) 14, random access memory (RAM) 16, expansion RAM 17, input/output (I/O) circuitry 18, display assembly 20, and expansion bus 22. The pen computer system 10 may also optionally include a mass storage unit 24 such as a disk drive unit or nonvolatile memory such as flash memory and a real-time clock 26.

The CPU 12 is preferably a commercially available, single chip microprocessor, and is preferably a complex instruction set computer (CISC) chip such as the 68040 microprocessor available from Motorola, Inc. CPU 12 is coupled to ROM 14 by a data bus 28, control bus 29, and address bus 31. ROM 14 contains the basic operating system for the pen computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display assembly 20 of pen computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 can be a thin, clear membrane which covers the LCD display and which is sensitive to the position of a stylus 38 on its surface. Alternatively, screens can be provided with an embedded RF digitizer and an "active" RF stylus. There are also other types of screen/tablet techniques. Combination display assemblies such as display assembly 20 are available from a variety of vendors.

Other types of user inputs can also be used in conjunction with the present invention. While the method of the present invention is described in the context of a pen computer system, other pointing devices such as a computer mouse, a track ball, or a tablet can be used to manipulate a pointer on a screen of a general purpose computer. Therefore, as used herein, the terms "pointer", "pointing device", "pointer inputs" and the like will refer to any mechanism or device for pointing to a particular location on a screen of a computer display.

Some type of mass storage 24 is generally considered desirable. However, the mass storage 24 can be eliminated by providing a sufficient amount of RAM 16 and expansion RAM 17 to store user application programs and data. In that case, RAMs 16 and 17 can be provided with a backup battery to prevent the loss of data even when the pen computer system 10 is turned off. However, it is generally desirable to have some type of long term storage 24 such as a commercially available miniature hard disk drive, non-volatile memory such as flash memory, battery backed RAM, PC-data cards, or the like.

In operation, information is input into the pen computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 then produces data which is output to the display assembly 20 to produce appropriate images on its screen.

Expansion bus 22 is coupled to the data bus 28, the control bus 29, and the address bus 31, similar to the other components in system 10. Expansion bus 22 provides extra ports to couple devices such as modems, display switches, microphone, speaker, etc. to the CPU 12.

Figure 2A:
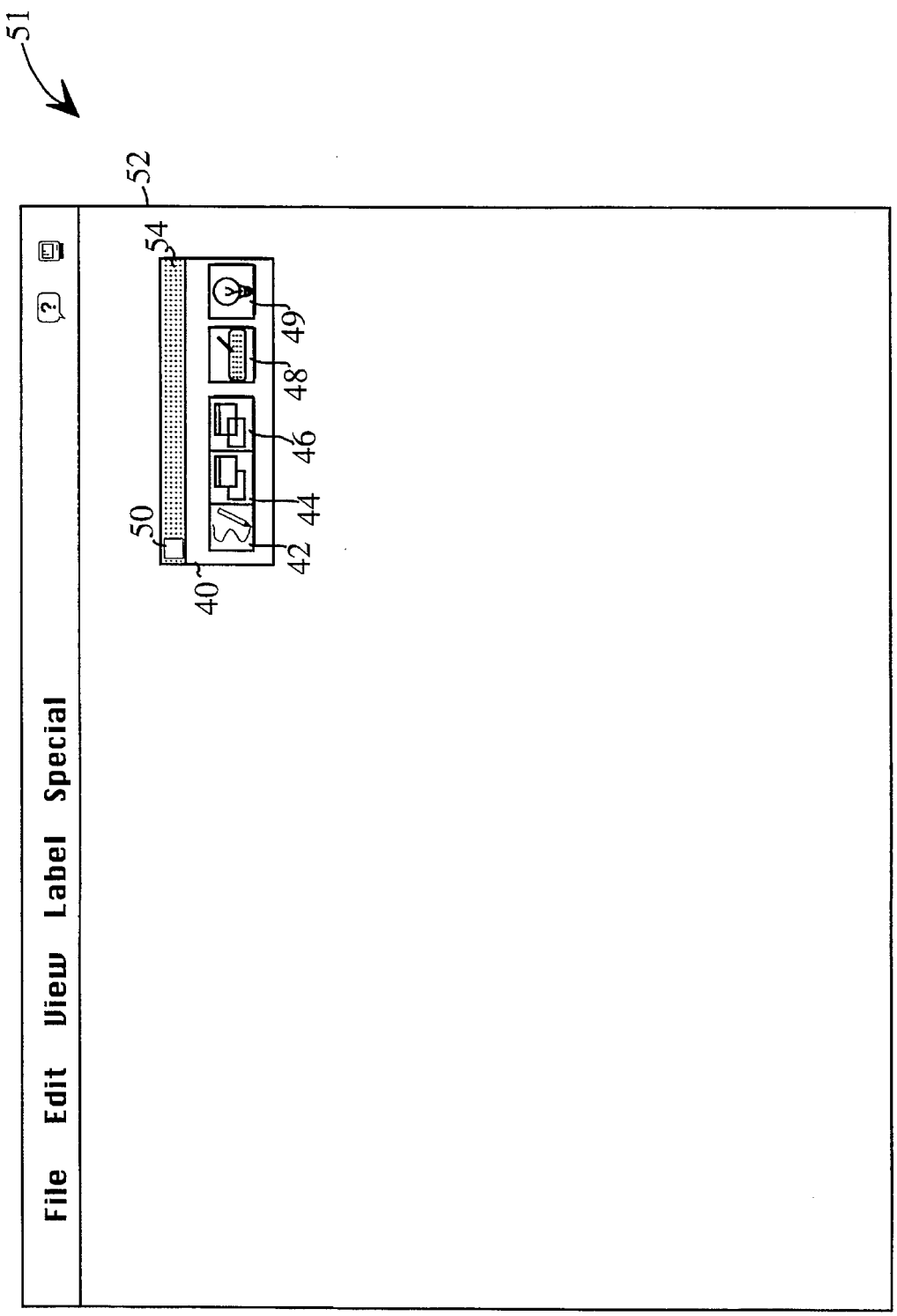
FIG. 2a illustrates an organizing image in accordance with the present invention as it appears on a screen of a computer system.
Figure 2B:
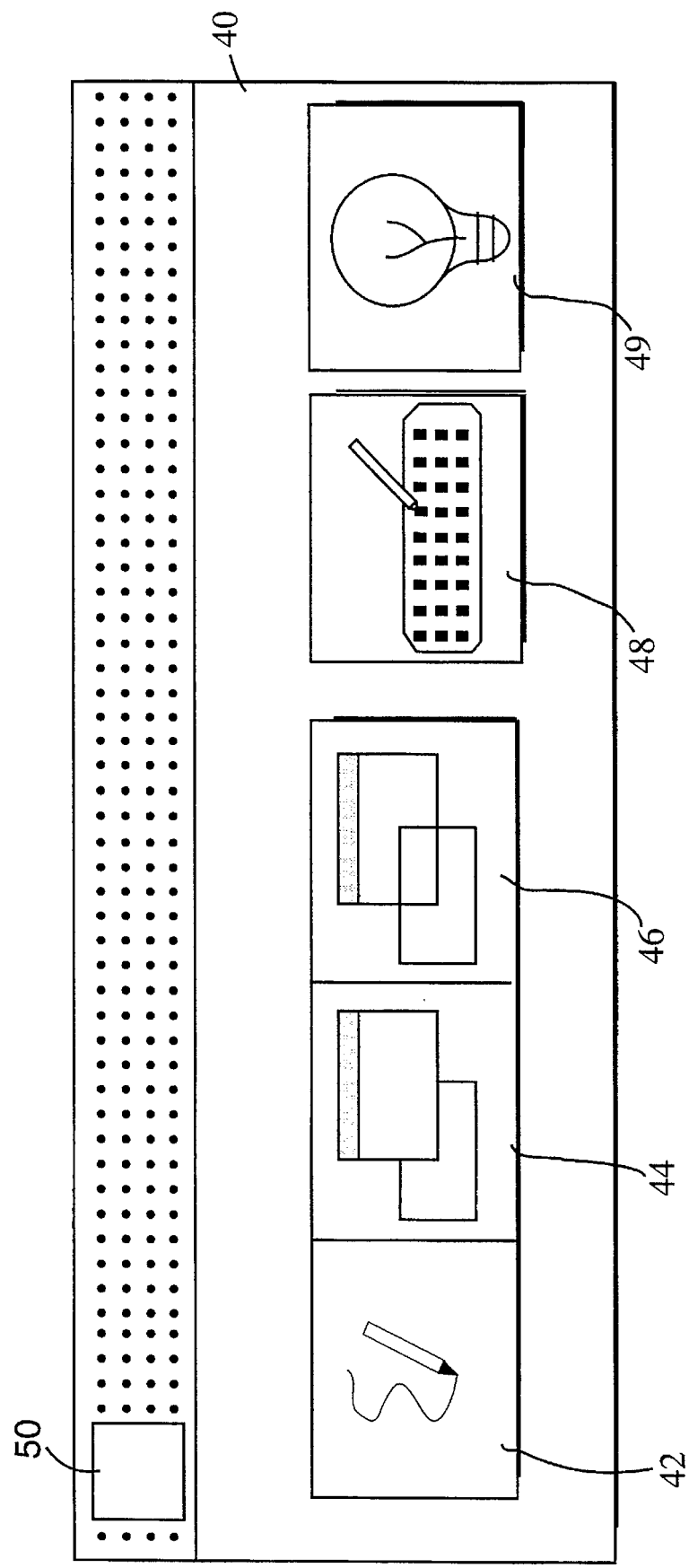

FIG. 2a illustrates an organizing image in accordance with the present invention displayed on the screen of a pen computer system. In this instance, the pen computer system is based upon the popular Macintosh Powerbook Duo, made by Apple Computer, Inc. of Cupertino, Calif. FIG. 2b illustrates an enlarged view of the organizing image. The organizing image includes a palette 40 which carries a number of icons 42, 44, 46, 48 and 49. These icons provide user interface to internal code resources for input images. Icon 42 activates a pull-down menu window which allows the selection of "nib" sizes. Icons 44 and 46 represent two other arbitrary utilities. Icons 42, 44, and 46 are grouped together because they are functionally related code resources while icon 48, representing a keyboard image, is a separately functioning code resource and therefore is shown separately. The palette also includes icon 49 that functions as a toggle and will close all open input images when selected, removing their view from the screen. When selected again, the input images return as they appeared in their last position. This provides better user control over screen space while maintaining quick access to input images by removing the need to individually open and close each chosen input image. Close box 50 on palette 40 can be selected to remove the palette from the screen, although the palette 40 is preferably always active on the screen and is separate and distinct from an application window.

FIG. 2a illustrates a screen 51 of display assembly 20 with palette 40 displayed on the "desktop" of a Macintosh computer system. A computer implemented process, PEN-BOARD™, which produces the palette 40 and associated icons is preferably placed in the system extension folder of the Macintosh computer system. This causes activation of the computer implemented process upon the start-up of the computer system to make the palette 40 always available for user activation of input utilities. The computer implemented process of the present invention can also be implemented in other operating systems, such as MS-DOS or UNIX operating systems, in an analogous fashion. The palette 40 can be positioned on the desktop as desired by engaging the stylus 38 on the top bar 54 of the palette 40 while moving the stylus across the screen to a desired location. Any icons associated with the palette 40 move with the palette, and thus maintain their organization.

Figure 3:
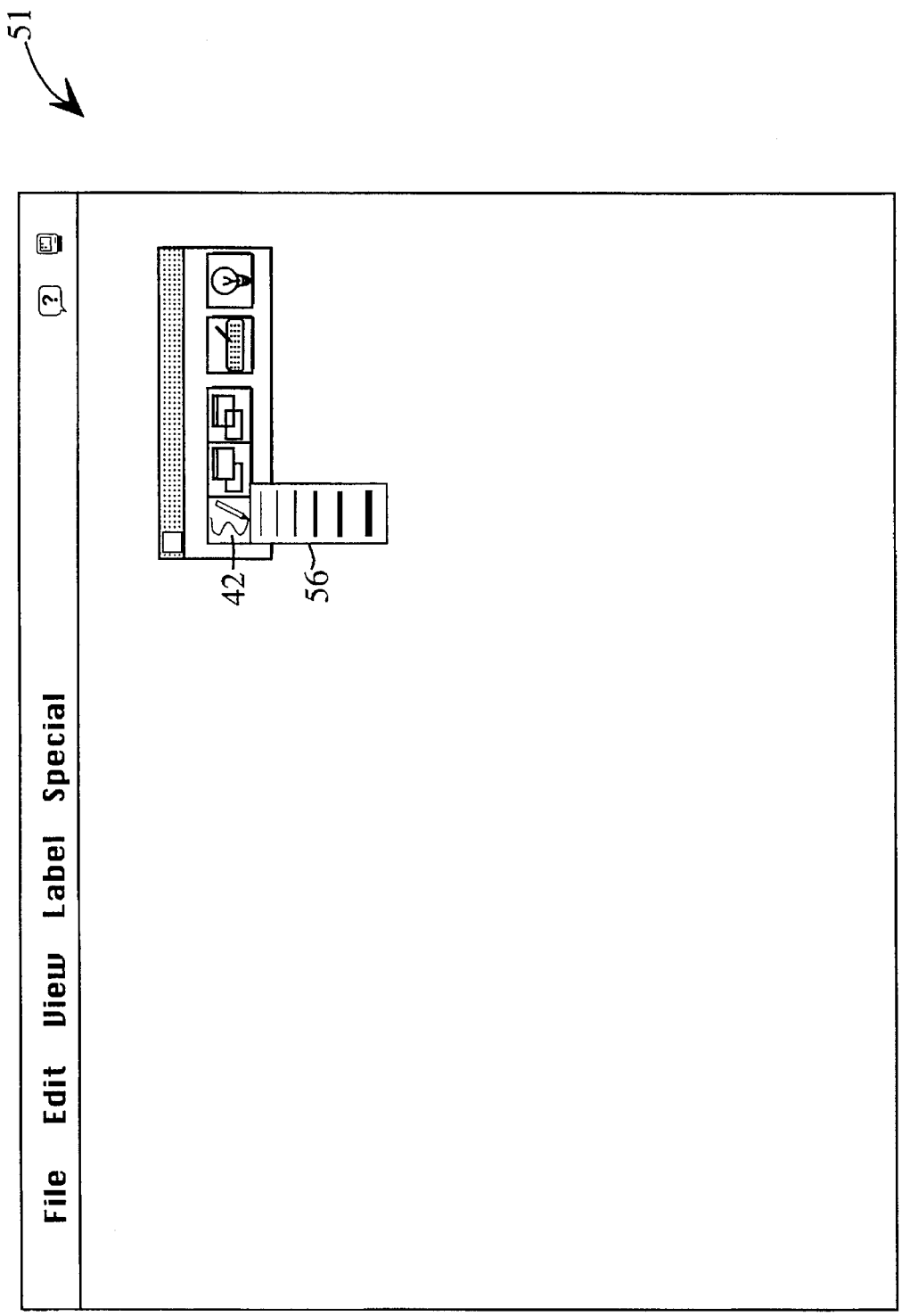
FIG. 3 illustrates the screen and organizing image of FIG. 2a with an activated pull-down menu.

FIG. 3 shows the screen 51 as in FIG. 2a with the selection of icon 42 by means of the stylus 38. This engagement of the stylus 38 with icon 42 causes the display of a pull-down menu 56. The menu 56 allows the selection of various pen stroke widths, i.e. the menu 56 allows the selection of pen "nib" size.

Figure 4A:
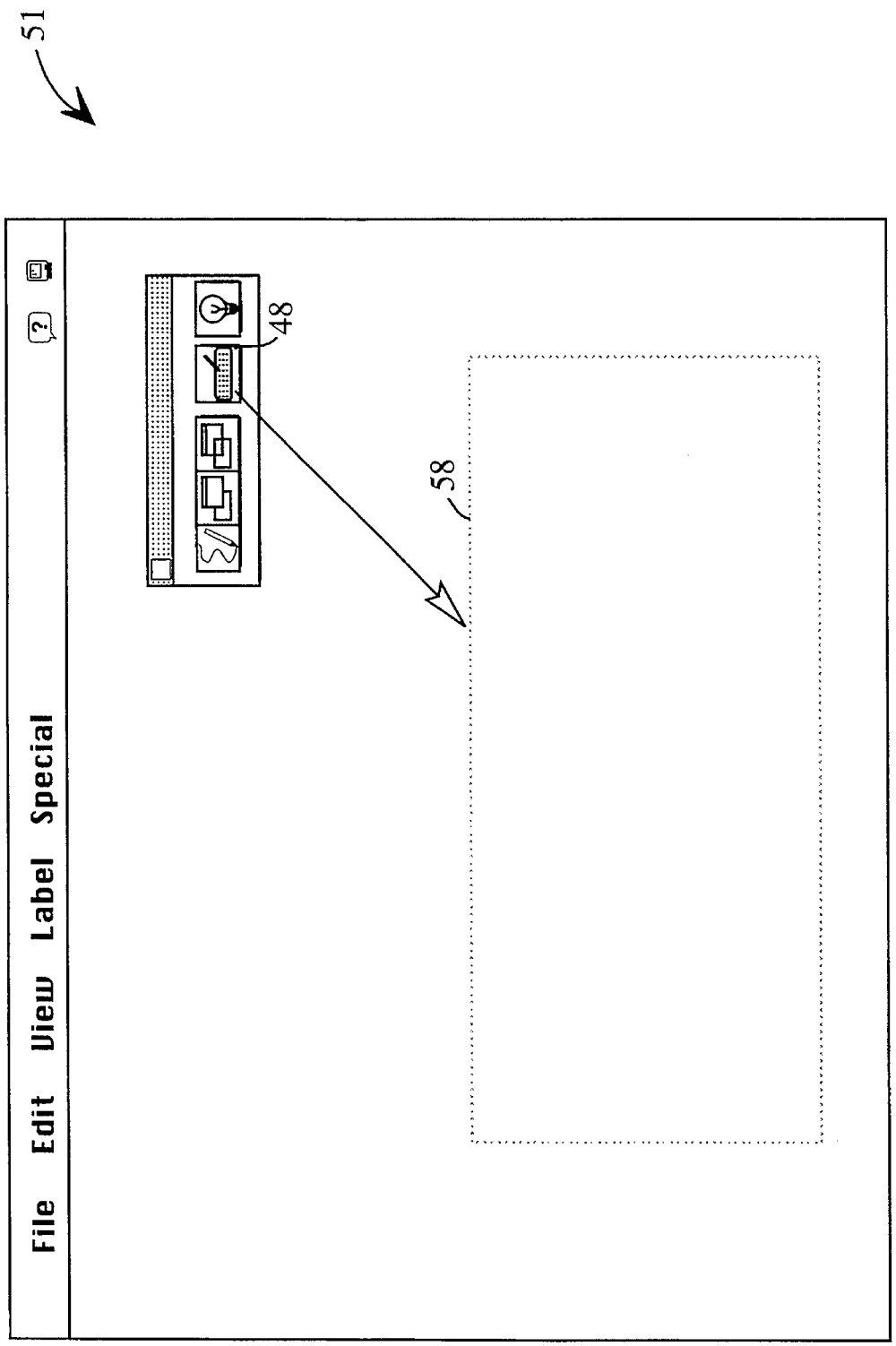
FIG. 4a illustrates an outline of a keyboard input image as it is moved from the palette.
Figure 4B:
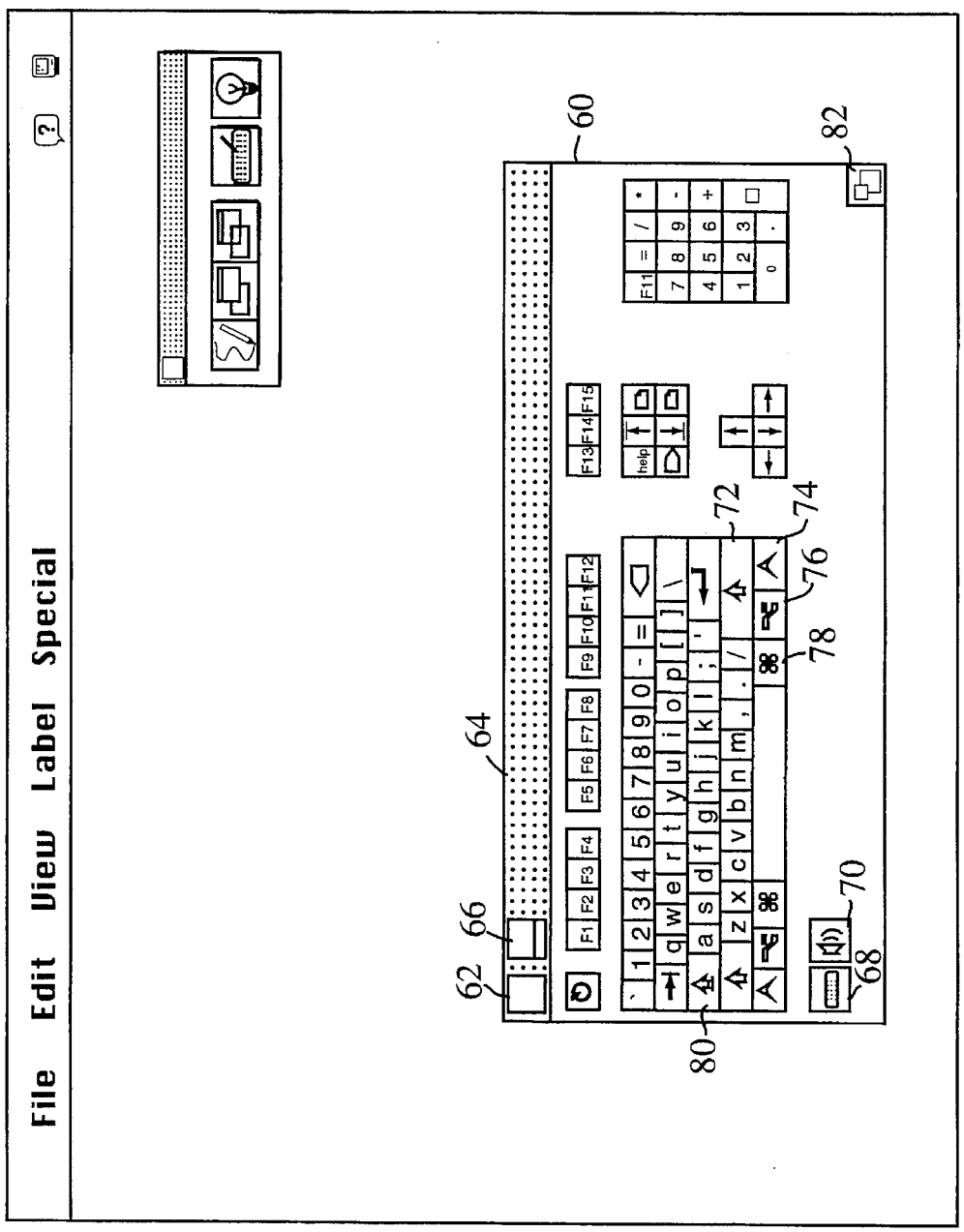
FIG. 4b illustrates the keyboard input image in its activated position.

The present invention allows selective activation of input utilities associated with palette 40. FIG. 4a illustrates the screen 51 as in FIG. 2a and the selection of icon 48, resulting in the display of an outline 58 of a keyboard image 60 (FIG. 4b). The outline 58 is a representation of an input image corresponding to an icon. Of course, other representational images can also be used. Selection, in this instance, refers to engaging and dragging the icon 48 with the stylus 38. The ability to activate an input image by dragging an icon from an organizing image such as palette 40 allows the user to selectively place the input image on the screen, providing more control and better utilization of limited desk space. Further, by providing an outline of the input image, the user knows the size and shape of the input image and, therefore, can accurately place the input image at a location that does not interfere with other images on the screen. Selection can also be accomplished by "clicking" on the icon 48 with the stylus 38, which creates the keyboard image in the position that it was in when it was last on the screen. It should be noted that the selection and operation of the input images in accordance with the present invention is described and illustrated with reference to a keyboard image but is not limited to the keyboard image. For example, other images, such as images including recognition fields, can also be utilized with the computer implemented process of the present invention.

FIG. 4b illustrates a keyboard image 60 produced by the user actions illustrated in FIG. 4a. The keyboard image 60 has a close box 62 in the drag bar 64 which can be engaged by stylus 38 to remove the keyboard image from the screen. The drag bar 64, when selected, allows the user to move the keyboard image by dragging it around the screen. Next to the close box in the drag bar 64 is a control box 66 that controls the display of the boxes 68 and 70 beneath the keyboard image layout. The ability to display and hide these boxes allows for better conservation of screen space. Box 68, when activated, displays a pop-up menu (not shown) of the currently installed keyboard options available, allowing the keyboard image layout to be changed with selection of one from the displayed menu. Keyboard image 60 represents an extended keyboard layout in this figure. Next to box 68 is box 70 which can be selected to adjust the volume of a "clicking" noise made when each key is selected. The sound is preferably off by default. Selection of the keys of the keyboard image 60 by stylus 38 produces text output directly to a chosen location of an active application program, i.e. the keyboard image 60 is indistinguishable from a physical keyboard as far as the application program is concerned.

Clicking once to select modifier keys 72, 74, 76, and 78, the shift, option, control, and command keys, respectively, modifies the next selected character key in the appropriate manner for the application program running. For example, in virtually all Macintosh word processing systems, a ⌘S (where the ⌘ signifies "command") command will save the current document to a hard disk or other storage device. Such commands are conveniently entered from the keyboard input image. The symbol appearance of the key caps on the keyboard input image changes to reflect the effect of modifier key selection, except in the case of representing uppercase letters, which are never shown on the keys. Double-clicking on a modifier key enables or "sticks" the key until it is single-clicked upon. Single-clicking modifier key 80, the caps lock key, is the same as double-clicking any of the other modifier keys. Box 82, the resize box, in the lower right-hand corner allows the user to change the length and width of the keyboard image, providing better user control of the screen space.

Figure 4C:
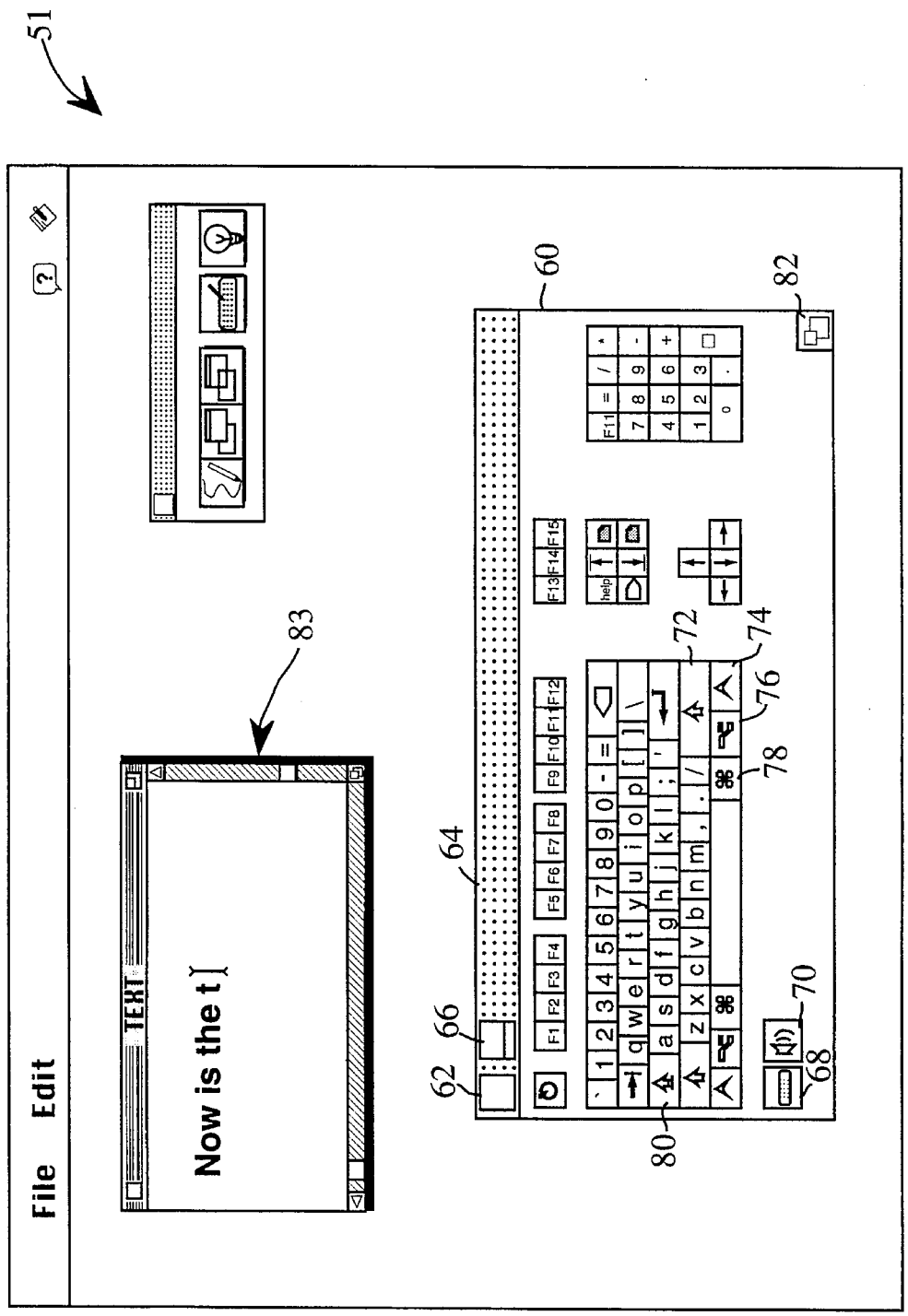
FIG. 4c illustrates the use of the keyboard image to input data into an active application program.

In FIG. 4c, an active application produces an active window 83 on the screen 51. The illustrated window 83 is produced, in this example, by a word processing program call "TeachText." As keys are pressed on the keyboard image 60 with the stylus 38, characters are input into the TeachText program and are displayed within the window 83. Since TeachText is currently a non-pen-aware program, it expects to receive characters from a physical keyboard, and not from a stylus. However, the computer implemented process of the present invention intercepts calls made by TeachText to the input event queue and passes characters to TeachText from the keyboard image 60 just as if they had been entered into the computer system from a physical keyboard.

Figure 5:
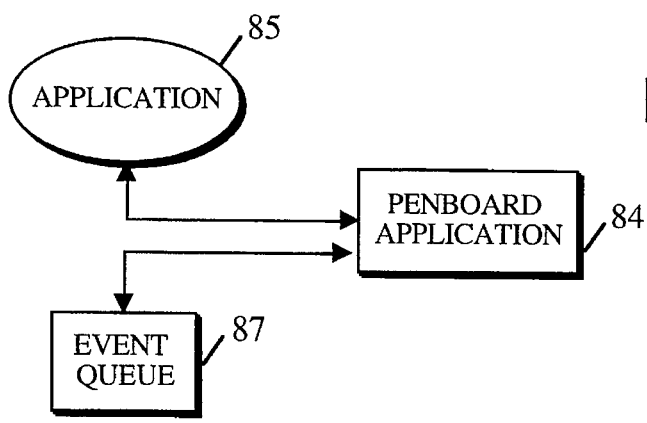
FIG. 5 illustrates a computer implemented process which intercepts calls to an event queue by an active application program.

FIG. 5 illustrates the interaction of the computer implemented process 84 of the present invention with an active application program 85 (such as the aforementioned Teach-Text program) and the system's input event queue 87. System event queues are well known to those skilled in the art of programming, especially those programmers skilled in programming Macintosh computer systems. The computer implemented process of the present invention is known as PENBOARD™, and is shown as block 84 in FIG. 5. This computer implemented process of the present invention will henceforth be referred to as "process 84." Process 84 analyzes contacts of the stylus with the screen, and controls the flow of input request calls to and from the system event queue.

Preferably, the process 84 is implemented as a Macintosh "init" or "system extension" and is placed in the system's extension folder. Inits and system extensions are activated upon start-up of the computer system, thus making them always active to perform system-type tasks. Of course, other operating systems such as MS-DOS and UNIX will have analogous methods for implementing the computer implemented method of the present invention. As suggested in the FIG. 5, process 84 appears to an application 85 as if it were an event queue, and appears to the event queue 87 as if it were just another application program requesting an event. As such, the process 84 can control the input of data to an active application program 85.

Figure 6:
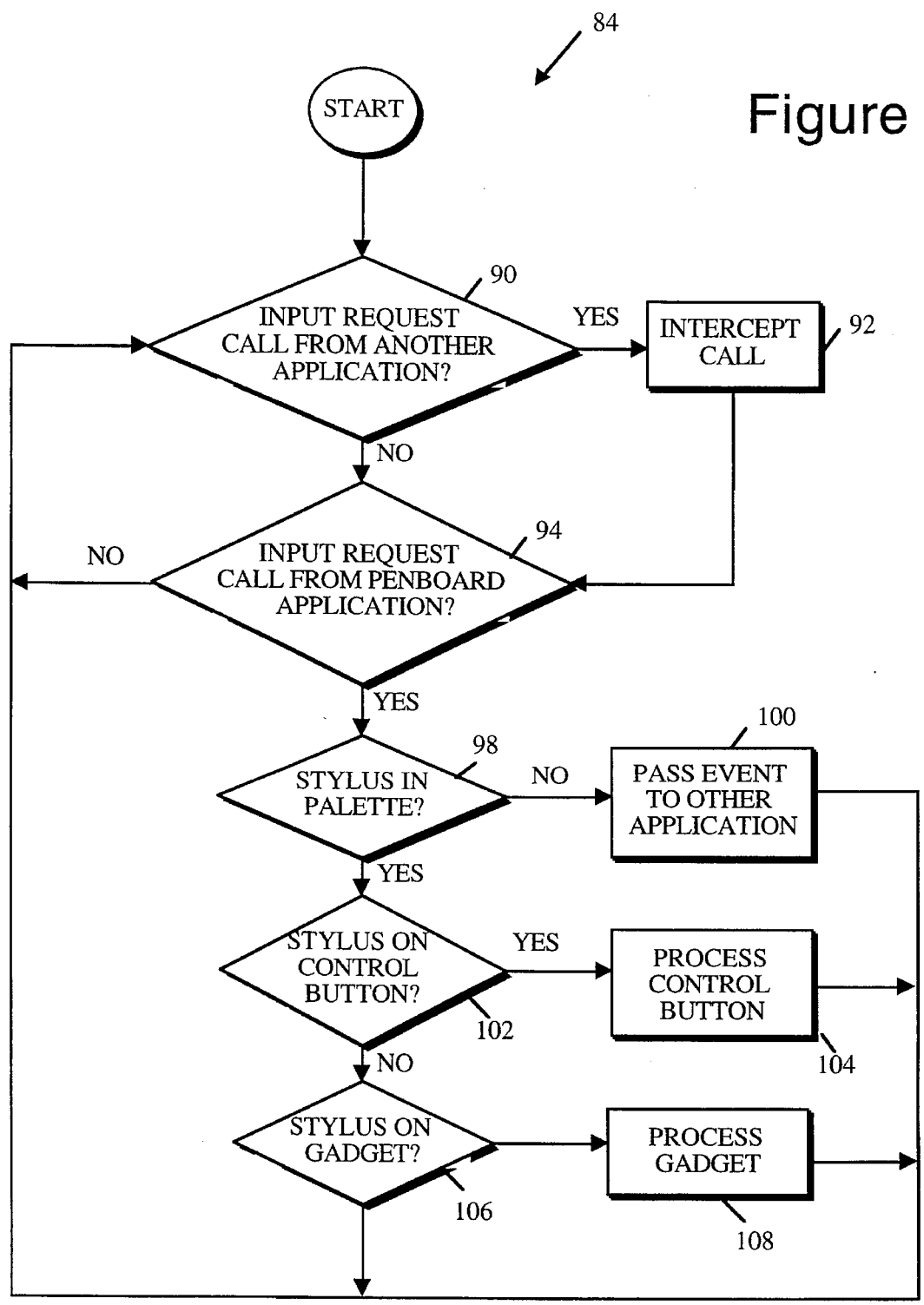
FIG. 6 is a flow diagram illustrating step 84 of FIG. 5.

FIG. 6 is a flow diagram of the computer implemented process 84 illustrated in FIG. 5. Process 84 checks for an input request call from an active application (such as the application 85) in a step 90. If a call is detected, the call is intercepted in step 92. After intercepting the call, a check is made for input request calls from process 84 itself in step 94. If such a call is detected, then a check is made for the presence of the stylus in the palette in step 98. If the stylus is not in the palette, the contact with the screen was intended for the active application, some other application, or the operating system itself and not for process 84, and the event is passed to the active application in step 100 by being placed on the event queue. Upon completion, the process returns to step 90 to begin checking for new inputs.

Figure 7:
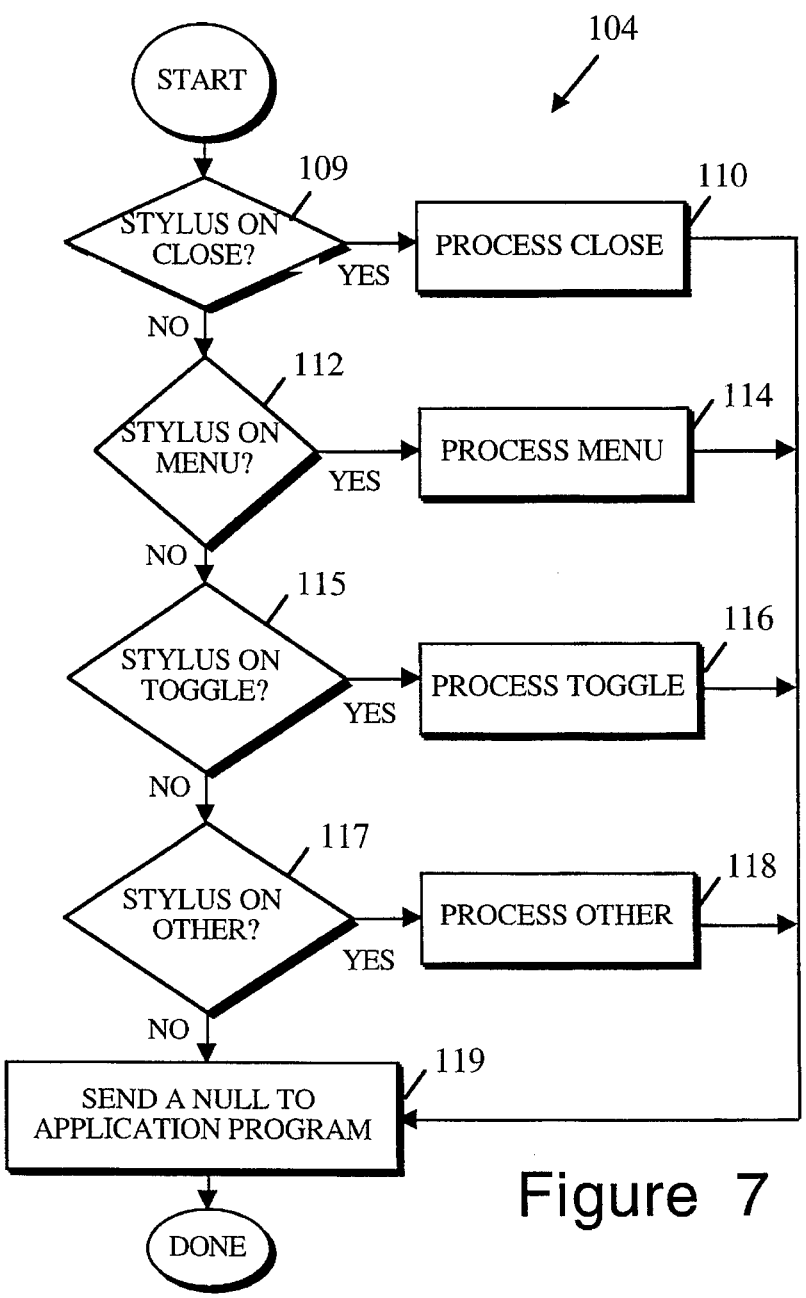
FIG. 7 is a flow diagram illustrating step 104 of FIG. 6.

If the stylus was in the palette, step 102 checks for the presence of the stylus on a control button of the palette. If detected on a control button, the next step 104, illustrated in FIG. 7, is to process the control button, and then the process returns to step 90. If the stylus is not detected on a control button, a step 106 checks for the stylus on an input image icon or "gadget" of the palette. As used herein, "gadget" will refer to an icon which represents an input utility, the input image associated with the input utility, and the input utility itself. If the stylus is detected on a gadget, the process gadget step 108, illustrated in FIG. 8, is performed and then the process returns to step 90.

FIG. 7 is a flow diagram illustrating the process step 104 of FIG. 6 in greater detail. The process begins in step 109 by checking for stylus engagement with the close box. If such engagement is detected, the palette is removed from the screen by the process 110. If no engagement with the close box is detected, the next step 112 checks to see if the stylus is engaged with an icon representing a pull-down menu. If the stylus is on such an icon, the selection is processed in step 114 to display the pull-down menu. If the stylus is not on the such an icon, the next step 115 is to check for the stylus on the toggle button. The subsequent processing, represented in step 116, opens or closes the input images as required to perform the toggle. In the Macintosh operating system, input images are forms of "objects" which can be made visible or invisible by appropriate high-level commands. Therefore, the process toggle step 116 simply tell all active input images to become invisible if they are currently visible, and to become visible if they are currently invisible.

If the stylus is not detected on the toggle button, a check is made for contact on any other part of the palette in step 117, such as contact with the header bar for the palette, and if detected, the contact is processed in step 118. For example, a dragging motion made by the stylus on the header bar of the palette will cause the palette to be dragged to a new position on the screen. Upon completion of steps 114, 116, or 118, a null event is sent to the active application program in step 119 (so that no input data is sent to the application) and the process is then complete.

Figure 8:
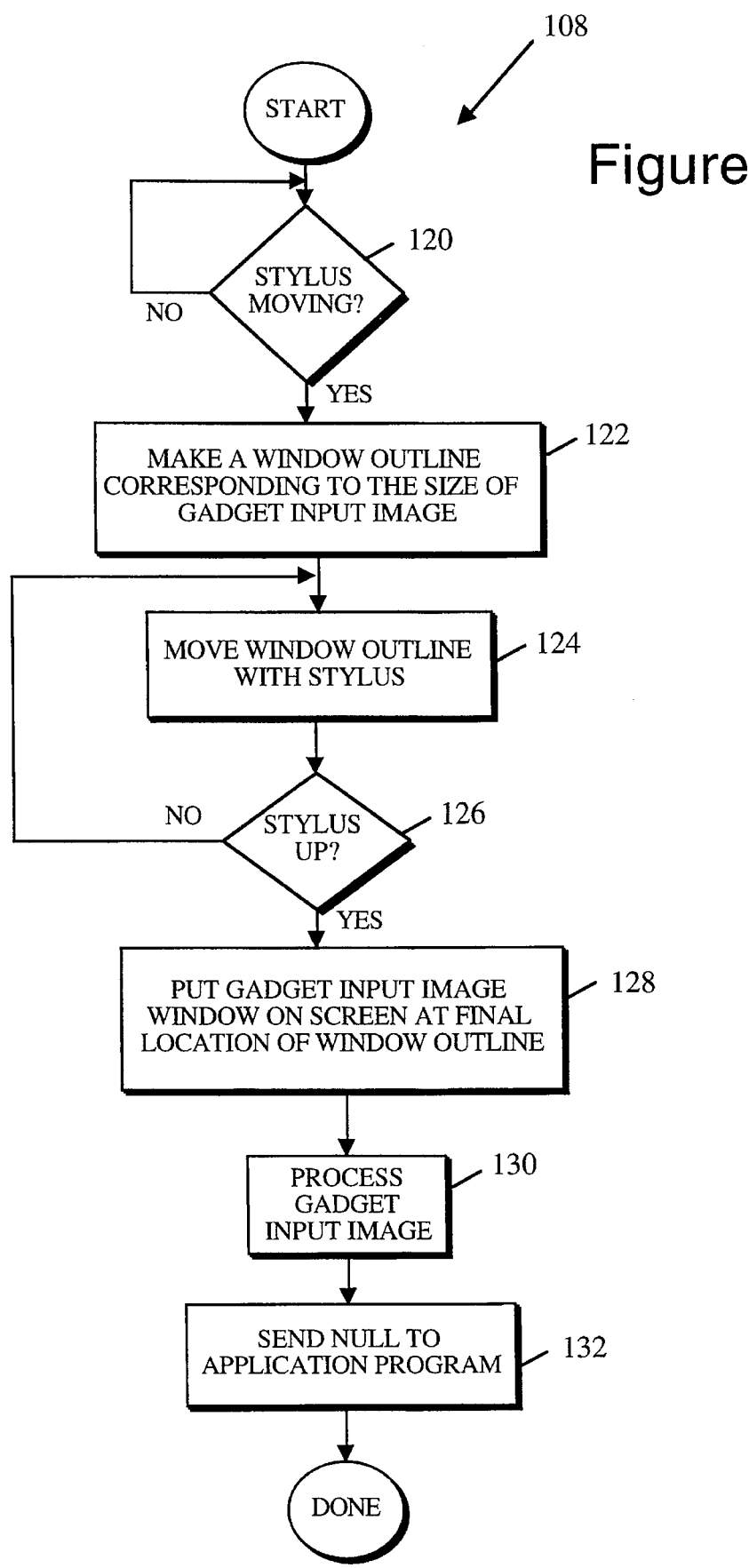
FIG. 8 is a flow diagram illustrating step 108 of FIG. 6.
Figure 9:
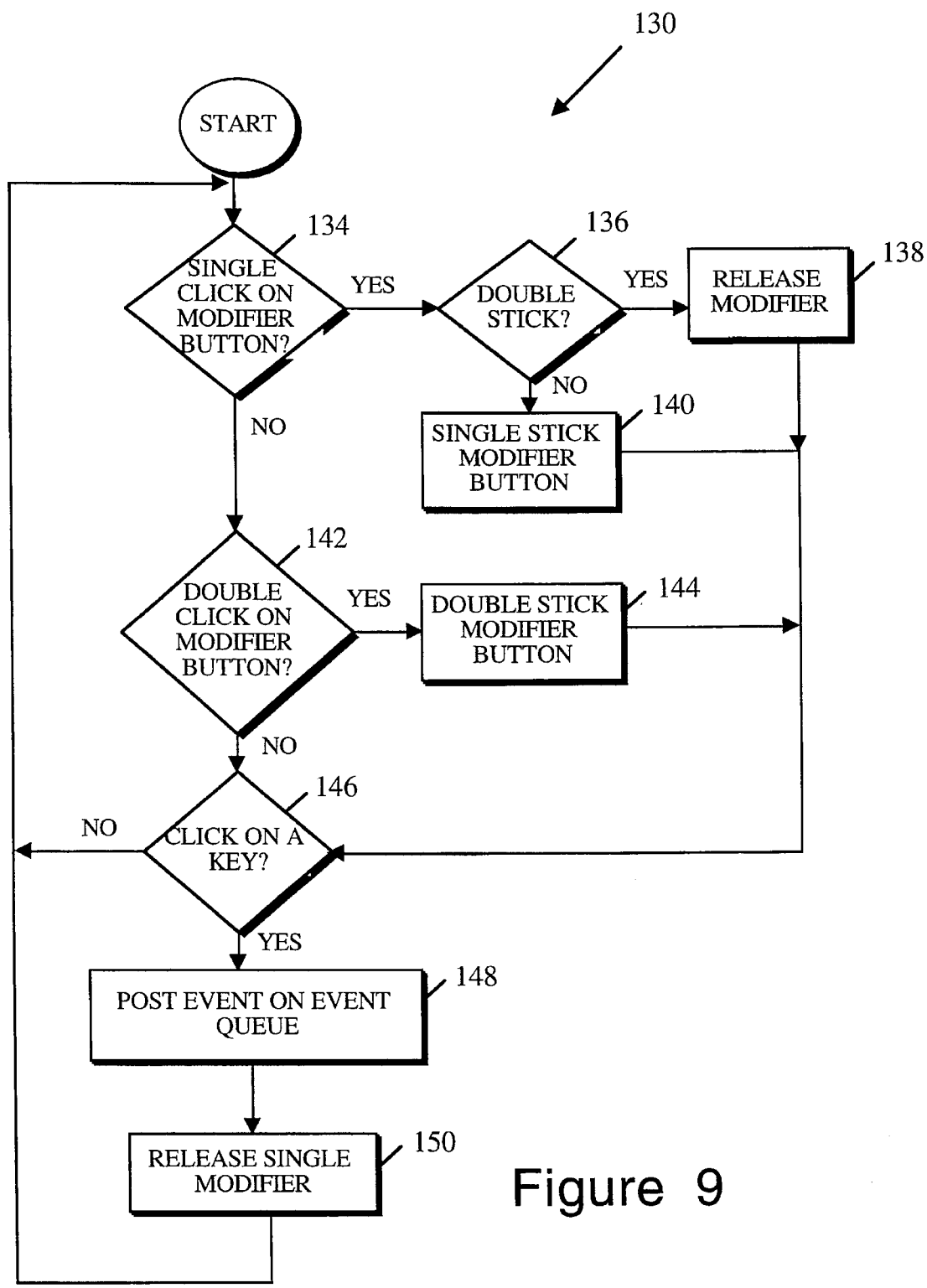
FIG. 9 is a flow diagram illustrating step 130 of FIG. 8.

FIG. 8 illustrates the process 108 of FIG. 6 in greater detail. A first step 120 checks for stylus movement. Movement detection indicates that an icon is being dragged from the palette to activate an input utility or gadget. When the movement is detected, the next step 122 is to create a window outline or "outline" of the gadget input image. The outline, representing the size and shape of the input image being selected, allows the placement of the input image at a desired location. The outline moves with the stylus in steps 124 and 126 until the stylus is lifted from the screen. The movement of the outline across the screen is easily accomplished by updating its position by Δx, Δy as the stylus moves by Δx, Δy in a time Δt. The gadget input image is then placed at the final location of the outline in step 128. The gadget input image processing is accomplished in the next step 130 to allow data input to the application. An example of this process 130 is illustrated in FIG. 9 for the keyboard image. A null is sent to the application program in step 132 upon completion of step 130, and the process is completed.

FIG. 9 is a flow diagram of step 130 of FIG. 8 for the keyboard input image. The first step 134 in this process is to check for a single click on a modifier key. A single click is defined as the engagement of the stylus with a key for at least a predetermined period of time without moving off of the key. If a single click has been made by the stylus, the next step 136 is to check to see if the modifier key was previously caused to be a "double stick", which causes the modifier key to remain selected (i.e. "stuck") until it is clicked again. In the present invention, a "double stick" is caused by a double click of the stylus 38 on a modifier key. A "double click" is defined as the stylus being engaged with the modifier key, being lifted from the screen, and being re-engaged with the modifier key within a predetermined period of time (e.g. $1/10$th of a second). If the modifier key was a "double stick" due to a previous double-clicking, the new single click causes the stuck modifier key to be released in step 138. If the single click is not undoing a double stick of a modifier key, the modifier key is made to "single-stick" in step 140. This "single-stick" of the modifier key causes the modifier key to be selected only until another key is selected to perform a desired function.

If a single click is not detected in step 134, the next step 142 checks for a double click on a modifier key. If a double click is detected, the modifier key is made a "double-stick" as described previously in step 144. Upon completion of these steps, the process then checks for a click on a key in step 146. If selection of a key is detected, the action, either a key selection or modified key selection, is posted on the event queue in step 148 so that the action can be sent to the application program. It should be noted that the application program does not know that this event in the event queue was made by the process of the present invention or by a physical keyboard, or by any other device. Therefore, input from the keyboard image is indistinguishable from input from a physical keyboard, as far as the application program is concerned. The final step 150 of process 130 is to release a single stuck modifier key before repeating the process from step 134. This series of steps allows the keyboard image to emulate the performance of an external physical keyboard with proper operation of modifier and other key selections.

The entire process illustrated and described maintains the capability of inputting data, such as from a keyboard image, reliably on a pen computer system. By organizing the input images on a central palette that is movable and always available, input images can be activated easily while maintaining user control over screen space. Thus, data input into an active application can be accomplished smoothly. Gadgets can be easily added to or removed from the palette 40 by placing icons into or removing icons out of the system folder, as will be appreciated by those skilled in the art.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for launching an input utility for use in entering data into an active application, said active application being a foreground application currently in use by a user, said method comprising:

displaying an organizing image on a screen of a computer system wherein said organizing image includes a palette having a plurality of icons representing an input utility displayed on said palette;

engaging one of said icons with a pointer means and moving said pointer means to a desired location on said screen;

activating said input utility and displaying an input image created for said input utility at about said desired location, said input image dedicating a portion of said screen for data input into said input utility; and linking said input image to said active application such that data input into said input utility is communicated to said active application.

2. A method as recited in claim 1 further comprising the step of displaying an outline of said input image which moves with said pointer means prior to displaying the input image.

3. A method for inputting data to an active application running on a computer system, said active application being a foreground application currently in use by a user, the method comprising:

creating an input image on a screen of a computer system, said input image dedicating a portion of said screen for data input to an active application program running on said computer system, said creation including substeps of:

(a) displaying on said screen an organizational image comprising a palette and a plurality of icons that represent input utilities; and (b) selecting one of said icons to create said input images on said screen by:
      (i) engaging the selected icon with said pointer means;
      (ii) moving said pointer means to a desired location on said screen; and
      (iii) displaying said input image at about said desired location;

linking said input image with said active application program;

detecting the engagement of said input image by a pointer means;

analyzing said engagement to determine input data; and sending said input data to said active application program.

4. A method for inputting data as recited in claim 3 further comprising:

creating a representational image on said screen of said input image after said icon is engaged by said pointer means; and dragging said representational image across said screen with said movement of said pointer means.

5. A method for inputting data as recited in claim 3 wherein said palette includes at least one button.

6. A method for inputting data as recited in claim 5 wherein said button toggles a function in said application.

7. A method for inputting data as recited in claim 5 wherein said button causes a menu of options related to said application program to be displayed on said screen.

8. A method for inputting data as recited in claim 3 wherein said input image comprises an image of a keyboard.

9. A method for inputting data to an active application program running on a computer system, said active application being a foreground application currently in use by a user, the method comprising:

initializing a computer implemented process for intercepting input request calls made by an active application program running on a computer system;

creating an input image on said screen, said input image dedicating a portion of said screen for data input to said application program, said creation including substeps of:
(a) displaying on said screen an organizational image comprising a palette having a plurality of icons that represent input utilities; and
(b) selecting one of said icons to create said input image on said screen;

linking said input image with said active application program;

detecting an engagement of a pointer means with said input image;

analyzing said engagement to determine appropriate input data;

sending said appropriate input dam to said active application program; and sending alternative input data to said active application program in response to said input request if no engagement has been made with said input image and if said alternative input data is available for said application from another source.

10. A method for inputting data as recited in claim 9 further comprising sending a null-input to said active application program in response to said input request call if said pointer means engages said input image.

11. A method for inputting data as recited in claim 9 wherein said substep of selecting comprises:

engaging said icon with said pointer means;

moving said pointer means to a desired location on said screen; and displaying said input image at about said desired location.

12. A method for inputting data as recited in claim 11 further comprising:

creating a representational image on said screen of said input image after said icon is engaged by said pointer means; and dragging said representational image across said screen with said movement of said pointer means.

13. A method for inputting data as recited in claim 9 wherein said palette includes at least one button.

14. A method for inputting data as recited in claim 13 wherein said button toggles a function in said application.

15. A method for inputting data as recited in claim 13 wherein said button causes a menu of options related to said application program to be displayed on said screen.

16. A method for inputting data as recited in claim 9 wherein said input image comprises an image of a keyboard.

17. A pen computer system comprising:

a central processing unit (CPU);

screen means coupled to said CPU;

tablet means coupled to said CPU;

stylus means adapted to engage said tablet means to input strokes to said CPU;

means for creating an input image on said screen means, said input image dedicating a portion of said screen for data input into an active application program running on said computer system, said active application being a foreground application currently in use by a user, said means for creating an input image having:
(a) means for displaying an organizational image on said screen including palette means having a plurality of icons that represent input utilities; and
(b) means for selecting one of said icons with said stylus means such that said input image is created on said screen means, said means for selecting the selected icon responsive to an engagement of said icon with said stylus means, operable to track a movement of said pointer means to a desired location on said screen means, and operable to display said input image at about said desired location;

means for linking said input image with said active application program;

means for detecting at least one stroke made by said stylus means on said tablet means such that said stroke engages said input image;

means for analyzing said at least one stroke to determine appropriate input data; and means for passing said appropriate input data to an active application program.

18. A pen computer system as recited in claim 17 wherein said tablet means overlies said screen means such that said screen means can be seen through said tablet means.

19. A pen computer system as recited in claim 17 wherein said means for selecting said icon comprises means for detecting the movement of said stylus means over said tablet means, and means for displaying said input image at a final location of said stylus means on said tablet means.

20. A pen computer system as recited in claim 19 further comprising:

means for creating a representational image of said input image after said screen is contacted by said stylus means; and means for dragging said representational image with said movement of said stylus means.

21. A pen computer system as recited in claim 17 wherein said palette means includes at least one button means.

22. A pen computer system as recited in claim 21 wherein said button means is operative to toggle a function in said application program.

23. A pen computer system as recited in claim 21 wherein said button means is operative to display a menu of options related to said application program on said screen means.

24. A pen computer system as recited in claim 17 wherein said input image comprises a keyboard.

25. A pen computer system as recited in claim 24 wherein a modifier key on said keyboard can be activated for single-time use by a single click with said stylus means.

26. A pen computer system as recited in claim 24 wherein a modifier key on said keyboard can be activated until being explicitly deactivated by a double click with said stylus means.

* * * * *